United States Patent [19]

Raj et al.

[11] Patent Number: 5,369,472
[45] Date of Patent: Nov. 29, 1994

[54] MICROPROCESSOR CONTROLLED HIGH VOLTAGE POWER SUPPLY

[75] Inventors: Guru B. Raj, Fairport; Om P. Sud, Rochester; Ted L. Flanders, Webster, all of N.Y.

[73] Assignee: Xerox Corporation, Stamford, Conn.

[21] Appl. No.: 985,708

[22] Filed: Dec. 4, 1992

[51] Int. Cl.$^5$ .................. G03G 21/00; G03G 15/02
[52] U.S. Cl. ............................... 355/208; 355/204; 355/219; 363/21
[58] Field of Search ............... 355/203, 204, 206, 208, 355/219; 363/21

[56] References Cited

U.S. PATENT DOCUMENTS

| | | | |
|---|---|---|---|
| 3,922,595 | 11/1975 | Vieri | 321/47 |
| 4,004,209 | 1/1977 | Lawson, Jr. | 321/2 |
| 4,037,271 | 7/1977 | Keller | 363/21 |
| 4,234,249 | 11/1980 | Weikel, Jr. et al. | 355/3 CH |
| 4,517,633 | 5/1985 | Melcher | 363/21 |
| 4,730,244 | 3/1988 | Zimmerman | 363/49 |
| 4,791,528 | 12/1988 | Suzuki et al. | 361/235 |
| 4,872,100 | 10/1989 | Diaz | 363/41 |
| 4,885,672 | 12/1989 | Watanabe | 363/21 |
| 4,947,102 | 8/1990 | Ekstrand et al. | 363/89 X |
| 4,999,672 | 3/1991 | Rice et al. | 355/202 |
| 5,142,329 | 8/1992 | Nakaya | 355/208 X |
| 5,146,601 | 9/1992 | Hosaka et al. | 355/208 X |
| 5,162,850 | 11/1992 | Nakashima | 355/208 |
| 5,202,725 | 4/1993 | Oku | 363/21 X |

OTHER PUBLICATIONS

"Shared Use of a High Voltage Power Supply with Individual Multiplier DC Outputs"; Silverberg, Xerox Disclosure Journal, vol. 8, No. 5, Sep./Oct. 1983, pp. 421–422.

"Shared High Voltage AC Power Supply"; Silverberg, Xerox Disclosure Journal; vol. 8, No. 5; Sep./Oct. 1983; pp. 423–424.

Intel 16-Bit Embedded Controller Handbook, 1990 pp. 4-0-4-93.

Primary Examiner—Fred L. Braun
Attorney, Agent, or Firm—Duane C. Basch

[57] ABSTRACT

The present invention is a power supply apparatus capable of providing one or more individually controllable high voltage outputs for various components within an electrophotographic printing machine. Receiving power from an input power source, the power supply apparatus produces various high voltage outputs, wherein each output is capable of providing a range of high voltage potentials. The individual high voltage outputs are regulated by a microcontroller which receives an analog voltage signal from a voltage sensor and produces a voltage control signal which is then used to regulate the outputs in a conventional manner for resonant- or switching-type power supplies. The microcontroller regulates the output potentials by varying the voltage control signals for each of the outputs as a function of the difference in magnitude between the analog voltage signal and a voltage set-point value associated with the output.

15 Claims, 5 Drawing Sheets

MICROPROCESSOR CONTROLLED HIGH VOLTAGE POWER SUPPLY

This invention relates generally to an apparatus for controlling the operation of a high voltage power supply, and more particularly to an integrated power supply capable of supplying multiple high and low voltages to an electrophotographic system.

BACKGROUND AND SUMMARY OF THE INVENTION

Frequently, an electrophotographic printing machine processes highlight or multicolor original documents to form copies thereof. In an electrophotographic printing machine, a photoconductive member is charged to a substantially uniform potential to sensitize the surface thereof. The charged portion of the photoconductive member is thereafter selectively exposed in an imaging zone to a light source such as a raster output scanner. Exposure of the charged photoconductive member dissipates the charge thereon in the irradiated areas. This discharge records an electrostatic latent image on the photoconductive member corresponding to the informational areas contained within the original document being reproduced. After the electrostatic latent image is recorded on the photoconductive member, the latent image is developed by bringing a developer material into contact therewith. Generally, the developer material comprises toner particles adhering triboelectrically to carrier granules. The toner particles are attracted to the latent image from the carrier granules to form a toner image on the photoconductive member which is subsequently transferred to a copy sheet. The copy sheet is then heated to permanently affix the toner image thereto in the image configuration.

Multicolor electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complimentary thereto. This process is repeated a plurality of cycles for differently colored images and their respective complimentarily colored toner. Each single color toner image is transferred to the copy sheet in superimposed registration with the prior toner image. This creates a multilayered toner image on the copy sheet. Thereafter, the multilayered toner image is permanently affixed to the copy sheet creating a color copy.

In the area of multicolor electrophotographic printing, it is highly desirable to accurately control the charging characteristics of the photoconductive surface at all stages of the electrophotographic process in order to obtain reliable renditions of the original document. Other charging devices are utilized within the transfer and cleaning operations of the electrophotographic process and the power supplied to these devices, as well as any bias voltages applied to enhance development of the latent images, must be similarly controlled.

Heretofore, numerous power supply designs have been employed within electroreprographic machines to control the voltage level produced by the power supplies. The following disclosures may be relevant to various aspects of the present invention:

U.S. Pat. No. 4,791,528 Patentee: Suzuki et al. Issued: Dec. 13, 1988

U.S. Pat. No. 4,517,633 Patentee: Melcher Issued: May 14, 1985

U.S. Pat. No. 4,234,249 Patentee: Weikel, Jr. et al. Issued: Nov. 18, 1990

U.S. Pat. No. 4,037,271 Patentee: Keller Issued: Jul. 19, 1977

U.S. Pat. No. 4,004,209 Patentee: Lawson, Jr. Issued: Jan. 18, 1977

U.S. Pat. No. 3,922,595 Patentee: Vieri Issued: Nov. 25, 1975

Xerox Disclosure Journal Author: M. Silverberg September/October 1983, Vol. 8, No. 5, pp. 421–422

The relevant portions of the foregoing patents and technical disclosures may be briefly summarized as follows:

U.S. Pat. No. 4,791,528 discloses an integrated power supply device for supplying both high and low voltages to various components of a copying machine. A single converter-transformer is used to provide the DC power. High-frequency AC power is supplied to the exposure lamp via a coil of the converter-transformer. High-voltage DC power is supplied to a charging device from a rectifier which is connected to another coil of the converter-transformer, while the low-voltage power used by the sequencing logic and developer bias circuits is supplied from a constant-voltage power supply comprised of a rectifier and a switching regulator connected to yet another coil of the converter-transformer.

U.S. Pat. No. 4,517,633 teaches a switched mode power supply employing a regulation circuit which controls the voltage by means of a storage capacitor and a transformer. A comparator is used to compare the output voltage with a reference voltage and to control a switching element in response thereto. Should the output potential fall below the reference potential, the switching element is closed and the storage capacitor is charged. On the other hand, when the output potential exceeds the reference potential, the switching element is opened and a current induced in the secondary coil of the transformer reduces the current flowing to the storage capacitor in proportion to the winding ratio of the transformer.

U.S. Pat. No. 4,234,249 discloses a tracking power supply to be used with an electrophotographic copying system. More specifically, the power supply provides AC voltage and an unfiltered, rectified DC voltage for powering corotrons from a common AC source so that all the corotrons are driven by voltages having a common wave shape. Such a design enables a single corotron voltage to be used to control the voltage supplied to the remaining corotrons.

U.S. Pat. No. 4,037,271, the relevant portions of which are hereby incorporated by reference, teaches a switching-type power supply suitable for providing approximately 170 volts of unregulated DC from a 115 volt AC supply. A transistorized power switch, controlled by a pulse-width modulator, is used to assure a constant DC voltage level from the rectified and filtered power supply output as a function of the rectified DC voltage level, the output voltage, and a signal from a current limiter.

U.S. Pat. No. 4,004,209 discloses a power supply or power conversion system which is suitable for producing a highly regulated output over a widely varying range of AC input source frequency variation. Key elements include: a full wave bridge rectifier, the output of which is filtered by a choke and capacitor combination to produce unregulated DC voltage; a transformer having a center-tapped primary to receive the unregulated DC voltage and a secondary winding; and a current limiter, attached to the secondary winding, comprising a saturable core transformer having a primary winding and two series connected, oppositely poled secondary windings which serve to limit the current passing therethrough.

U.S. Pat. No. 3,922,595 teaches a high power regulated DC supply suitable for converting ordinary AC line power in to stabilized direct current. The converter disclosed utilizes a pair of controlled gates which are selectively triggered during the alternating half-cycles of the AC input. The improvement includes a monostable multivibrator which is used to generate the pulse train required to trigger the controlled gates, as well as, control circuitry to provide control current to the multivibrator and thereby controlling the time position of the trigger pulses.

The Xerox Disclosure Journal technical disclosures describe the circuitry that may be employed to produce both AC and DC high voltage outputs in both shared and multiple-output configurations. Both disclosures are directed to the splitting and control of the high voltage output of the secondary winding of the high voltage transformer.

In accordance with the present invention, there is provided a power supply comprising, an input power source, and voltage output means for producing a high voltage output from the power supplied by the input power source in response to a voltage control signal. Also included in the power supply are means for sensing the potential of the high voltage output and generating an analog voltage signal indicative thereof, and a controller for receiving the analog voltage signal from said sensing means and producing the voltage control signal. The level the voltage control signal is regulated as a function of the difference between the analog voltage signal and a voltage setpoint value.

In accordance with another aspect of the present invention, there is provided a power supply including a direct current input power source for generating power, means, responsive to a voltage control signal, for converting the direct current power supplied by said direct current input power source into alternating current power, a transformer, including primary and secondary windings, for producing a high voltage output from the alternating current power supplied by said converting means, means for determining the potential of the high voltage output and generating an analog voltage signal indicative thereof, and a controller for receiving the analog voltage signal from said potential determining means and producing a voltage control signal. The level of the voltage control signal being regulated as a function of the difference between the analog voltage signal and a voltage setpoint value for the high voltage output.

In accordance with yet another aspect of the present invention, there is provided an electrophotographic imaging apparatus comprising a photoconductive member, means for charging the photoconductive member, means for exposing the charged photoconductive member to record an electrostatic latent image thereon, means for developing the electrostatic latent image recorded on the photoconductive member with toner, means for transferring the toner image from the photoconductive member to a support member, and a power supply including a plurality of outputs suitable for providing power to the charging means, developing means and transferring means, said power supply including a microcontroller for controlling the voltage potential of each of the outputs.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 5:
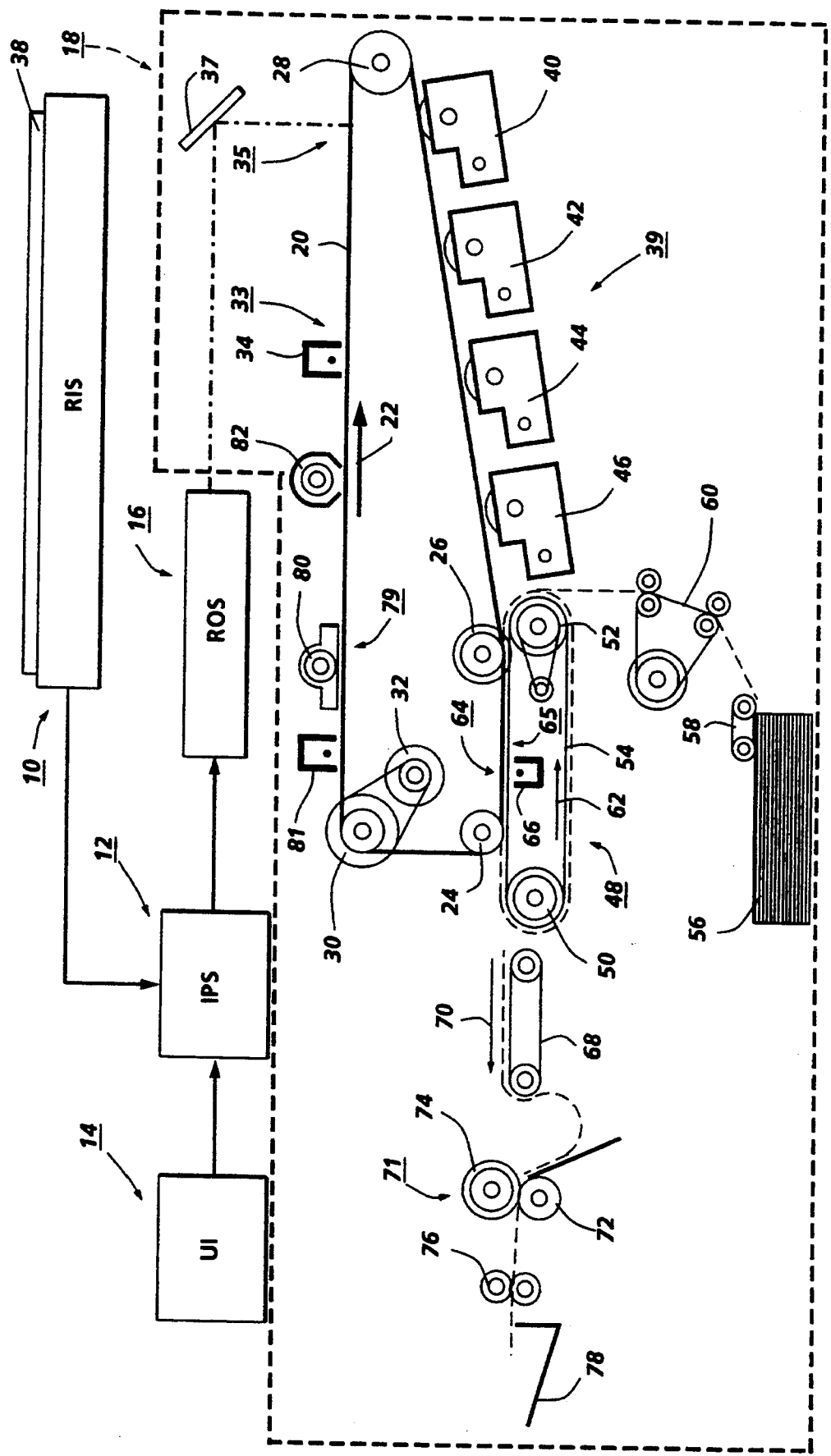
FIG. 5 is a schematic elevational view showing an electrophotographic printing machine incorporating the features of the present invention therein.

For a general understanding of the features of the present invention, reference is made to the drawings. In the drawings, like references have been used throughout to designate identical elements. FIG. 5 is a schematic elevational view showing an electrophotographic printing machine incorporating the features of the present invention therein. It will become evident from the following discussion that the present invention is equally well suited for use in a wide variety of printing systems, and is not necessarily limited in its application to the particular system shown herein.

Turning initially to FIG. 5, during operation of the printing system, a multicolor original document 38 is positioned on a raster input scanner (RIS), indicated generally by the reference numeral 10. The RIS contains document illumination lamps, optics, a mechanical scanning drive, and a charge coupled device (CCD array). The RIS captures the entire image from original document 38 and converts it to a series of raster scan lines and moreover measures a set of primary color densities, i.e. red, green and blue densities, at each point of the original document. This information is transmitted as electrical signals to an image processing system (IPS), indicated generally by the reference numeral 12. IPS 12 converts the set of red, green and blue density signals to a set of colorimetric coordinates. The IPS contains control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The operator actuates the appropriate keys of UI 14 to adjust the parameters of the copy. UI 14 may be a touch screen, or any other suitable control panel, providing an operator interface with the system. The output signal from UI 14 is transmitted to IPS 12. The IPS then transmits signals corresponding to the desired image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a resolution of about 400 pixels per inch, to achieve a set of subtractive primary latent images. The ROS will expose the photoconductive belt 15 to record three latent images which correspond to the signals transmitted from IPS 12. One latent image is developed with cyan developer material. Another latent image is developed with magenta developer material and the third latent image is developed with yellow developer material. These developed images are transferred to a copy sheet in superimposed registration with one another to form a multicolored image on the copy sheet. This multicolored image is then fused to the copy sheet forming a color copy.

With continued reference to FIG. 5, printer or marking engine 18 is an electrophotographic printing machine. Photoconductive belt 20 of marking engine 18 is preferably made from a polychromatic photo-conductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having a multicolored original document 38 positioned thereat. The modulated light beam impinges on the surface of photoconductive belt 20. The beam illuminates the charged portion of photoconductive belt to form an electrostatic latent image. The photoconductive belt is exposed at least three times to record latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as magnetic brush development units. Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material.

Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document, or that portion of the color image determined to be representative of black regions. Each of the developer units is moved into and out of an operative position. In the operative position, the magnetic brush is positioned substantially adjacent the photoconductive belt, while in the non-operative position, the magnetic brush is spaced therefrom. In FIG. 5, developer unit 40 is shown in the operative position with developer units 42, 44 and 46 being in the non-operative position. During development of each electrostatic latent image, only one developer unit is in the operative position, the remaining developer units are in the non-operative position. This insures that each electrostatic latent image is developed with toner 13 articles of the appropriate color without commingling.

After development, the toner image is moved to a transfer station, indicated generally by the reference numeral 65. Transfer station 65 includes a transfer zone, generally indicated by reference numeral 64 in transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown) extends between belts 54 and moves in unison therewith. A sheet is advanced from a stack of sheets 56 disposed on a tray. A friction retard feeder 58 advances the uppermost sheet from stack 56 onto a pre-transfer transport 60. Transport 60 advances the sheet to sheet transport 48 in synchronism with the movement of the sheet gripper. In this way, the leading edge of a sheet arrives at a preselected position, i.e. a loading zone, to be received by the open sheet gripper. The leading edge of the sheet is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another. One skilled in the art will appreciate that the sheet may move in a recirculating path for four cycles when under-color or black removal is used. Each of the electrostatic latent images recorded on the photoconductive surface is developed with the appropriately colored toner and transferred, in superimposed registration with one another, to the sheet to form the multicolor copy of the colored original document.

After the last transfer operation, the sheet transport system directs the sheet to a vacuum conveyor, indicated generally by the reference numeral 68. Vacuum conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

The last processing station in the direction of movement of belt 20, as indicated by arrow 22, is a cleaning station, indicated generally by the reference numeral 79. A rotatably mounted fibrous brush 80 is positioned in the cleaning station and maintained in contact with photoconductive belt 20 to remove residual toner particles remaining after the transfer operation. Cleaning station 79 may also employ pre-clean corotron 81, in association with brush 80, to further neutralize the electrostatic forces which attract the residual toner particles to belt 20, thereby improving the efficiency of the fibrous brush. Thereafter, lamp 82 illuminates photoconductive belt 20 to remove any residual charge remaining thereon prior to the start of the next successive cycle.

Figure 1:
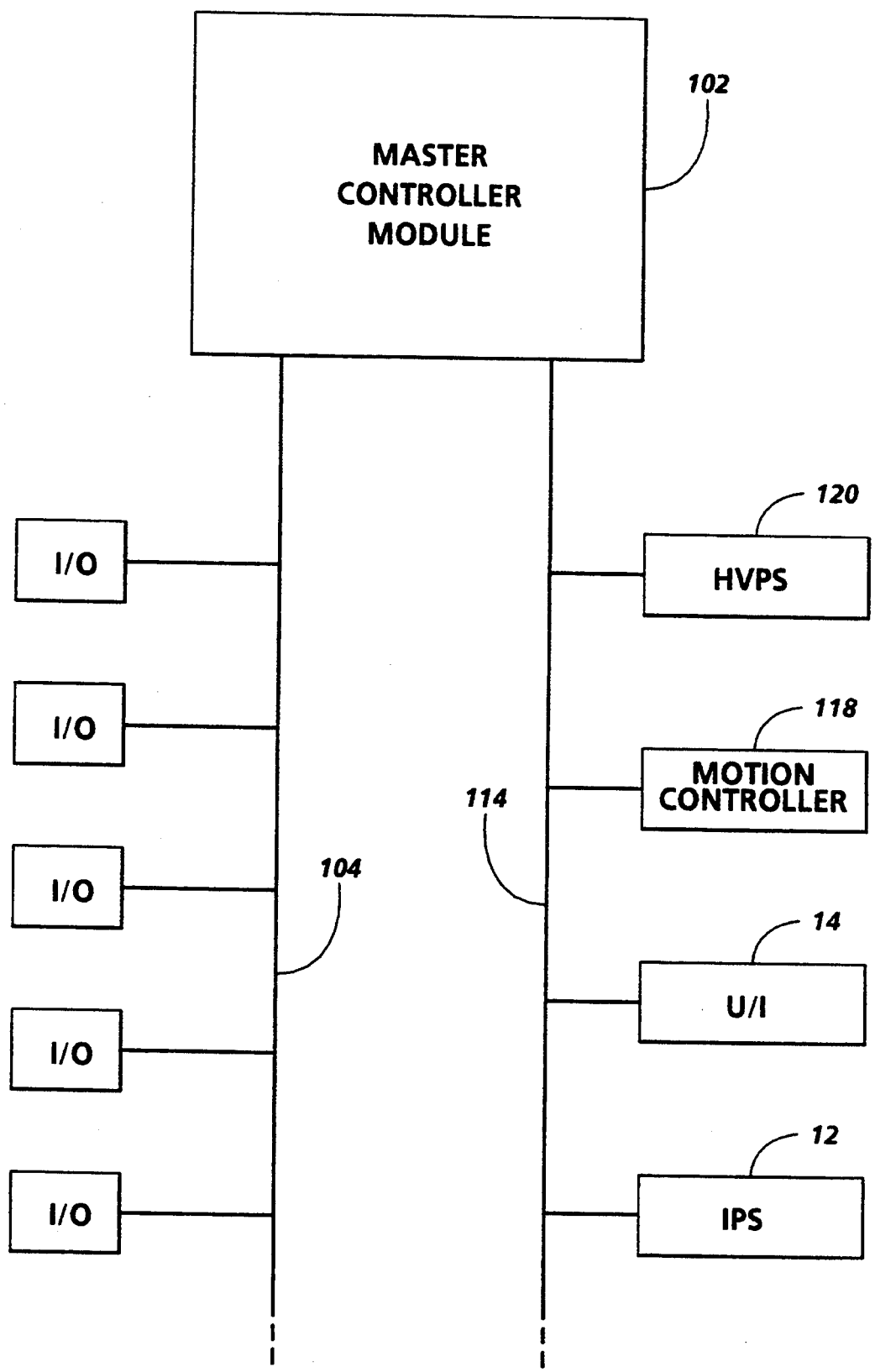
FIG. 1 is a block diagram of the functional elements used for the control of an electrophotographic printing machine.

Referring next to FIG. 1, operation of the electrophotographic printing machine is regulated by master controller module (MCM) 102. The MCM utilizes a multiplexed digital I/O bus, 104, to receive signals from various I/O devices associated with monitoring the operation of the machine. For example, the I/O devices may include an erase lamp, a copy sheet registration clutch, various paper path and developer drive motors, paper tray elevator motors and vacuum blowers. MCM 102 also interfaces with various other microcontroller-based components within the electrophotographic machine via a serial communication bus, 114. Bus 114 handles the transfer of digital information, including machine control signals and data, between the microcontrollers embedded within IPS 12, U/I 14, motion controller 118, and the high voltage power supply (HVPS) 120, as well as, other subsystems within the electrophotographic printing machine.

With respect to HVPS 120, the data and control signals passed between the HVPS and master controller module 102 include on/off signals for each of the various outputs provided by the HVPS, as well as, fault information which may be passed from the HVPS to the master controller. The data passed to the HVPS also includes the set-point or reference voltages for each of the various high voltage outputs therein.

Figure 2:
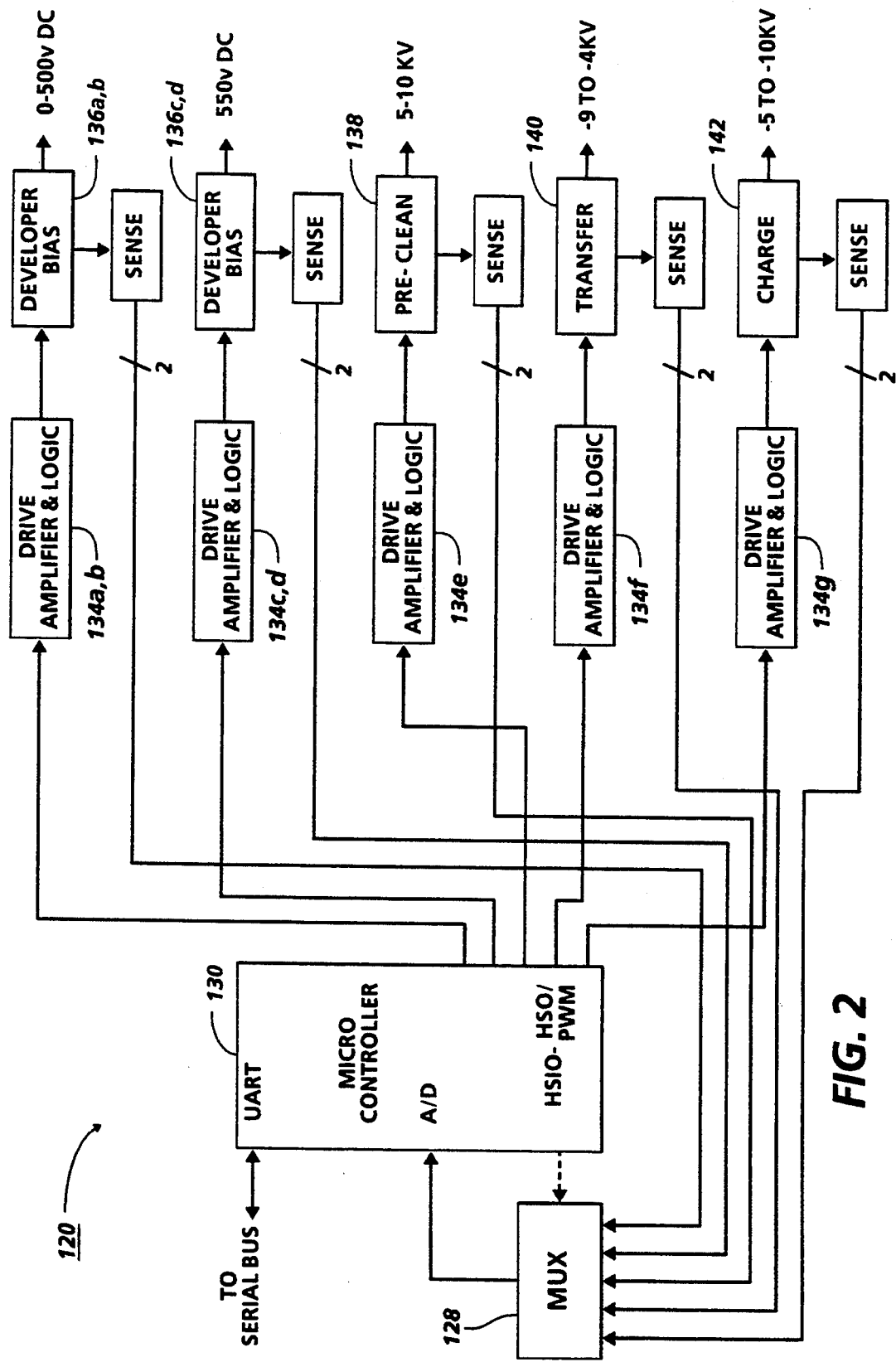
FIG. 2 is a block diagram of the high voltage power supply incorporating the features of the present invention therein.

FIG. 2 further illustrates, via a block diagram, the various elements of the high voltage power supply. In the embodiment illustrated, a single microcontroller, 130, is used to control the operation of at least one power supply output. In the present embodiment, microcontroller 130 is preferably a 16-bit embedded microcontroller, for example an Intel® 80C196, which includes an analog-to-digital (A/D) converter, a high-speed I/O port-(HSIO), a pulse-width modulation (PWM) output, and a serial port (UART).

Figure 3:
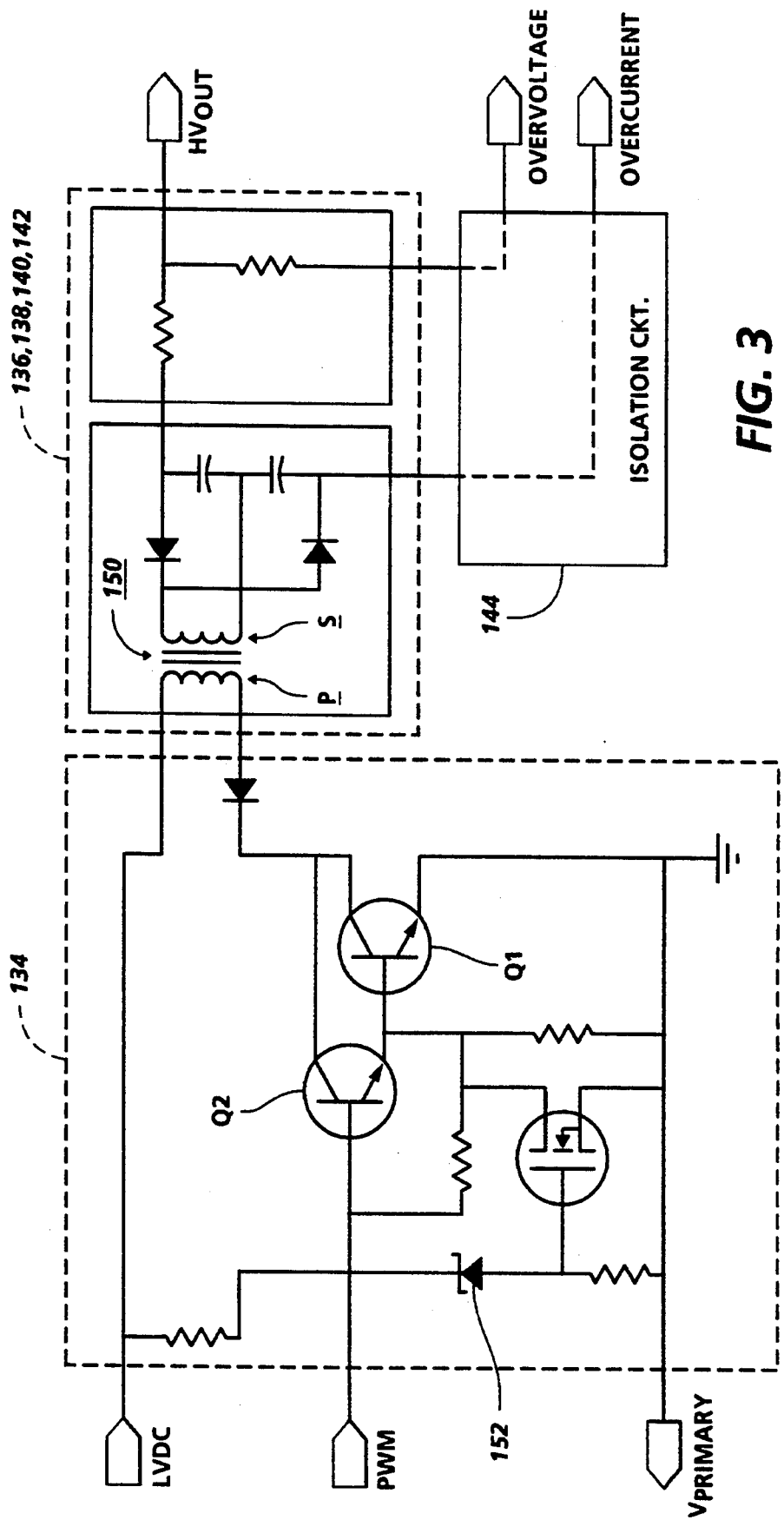
FIG. 3 is an electrical block diagram indicating the details of a microprocessor-controlled, switching-type, high voltage power supply.

HVPS 120 also includes a series of drive/amplifier logic blocks, 134a–g, each of which receives a pulse-width modulated voltage control signal from microcontroller 130. More specifically, the pulse-width modulated signal provided by the PWM or HSO outputs of microcontroller 130 provide a signal which controls the output voltage. In response to the pulse-width modulated signals, the drive/amplifier blocks control the low voltage current which is allowed to pass through the primary windings of an associated step-up transformer. As illustrated in FIG. 3, drive/amplifier block 134 includes a transistor network which controls the current passing through the primary winding, P, of transformer 150. The operation of drive/amplifier block 134 is regulated by the frequency and duty ratio of the PWM output, and may be accomplished by any commonly known switching circuit for regulating the current passing through the primary windings of the transformer. For example, transistor $Q_2$ acts as a driver to transistor $Q_1$. Since transformer 150 is an alternating current (AC) device, it cannot transfer energy to the secondary windings unless the flux linkage between the windings changes. The PWM input signal is used to accomplish the flux linkage change. However, since the flux cannot change instantaneously when the current to primary winding P is stopped, for example, whenever transistor $Q_1$ is "off", the voltage in the primary coil increases. Therefore, a diode, 152, is provided to protect the transistors from the voltage rise. Furthermore, the output of the secondary winding, S, of transformer 150 is controlled as a result of the regulated current passing through primary transformer coil P.

As illustrated in FIGS. 2 and 3, the individual transformer blocks, 136a–d, 138, 140 and 142, are all similar in construction, with the primary variations therebetween being the winding ratios of transformers 150 and the polarity of the outputs. More specifically, the winding ratio is determined by the output voltage range desired for the specific transformer block. For example, as illustrated in FIG. 2, the developer bias transformer blocks 136a–d are designed to output a voltage in the range of about 0 to 500 volts DC, while the charging transformer block is designed to output a −5 to −10 kilovolts DC. Hence, a low voltage DC input of about 24 volts is essentially converted to an AC waveshape via a switching transistor Q1. In order to achieve the desired output potential, the winding or turn ratio (primary to secondary) of transformer 150 in the developer bias transformer block would be on the order of about 0.048 to achieve a desired maximum output potential of about 500 volts. Similarly, as illustrated in FIG. 2, the pre-clean DC voltage is in the range of 5 to 10 kilovolts, while the transfer, 140, and charge, 142, outputs supply negative potentials in the ranges of −4 to −9 kilovolts and −5 to −10 kilovolts, respectively. It should be noted that previously cited potentials are machine dependent and are provided for purposes of illustration of the described embodiment rather than as limitations of the invention. The output of the transformer blocks may be integrated by the resistor-capacitor filter circuitry shown in transformer blocks 136, 138, 140 and 142 of FIG. 3, and provided on the $HV_{OUT}$ line, while two additional lines are passed out of the transformer blocks. The first line is the OVERVOLTAGE line and the second is the OVERCURRENT line, both of which may be passed through opto-isolation circuitry (144), and then used by the microcontroller, via the multiplexed A/D input, to monitor the operation of the power supply. Although not shown, commonly known output filters would be applied to the alternating current output of developer bias blocks 136a, 136b, 136c, and 136d to convert the output into a direct current (DC) bias.

More specifically, the voltage and current signals would be returned to multiplexer 128 where microcontroller 130 would periodically select the voltage and current signals at MUX 128, convert them into digital representations using the A/D converter input, and determine an impedance value for the transformer by dividing the voltage reading by the current reading. The impedance value would then be stored in non-volatile memory (not shown) by the microcontroller. During subsequent operation of each of the high voltage outputs, the impedance values for the transformer or output circuits may be compared with previously stored impedance values. Detection, by the microcontroller, of a substantial decrease in the impedance, or even a trend of decreasing impedances could signal an arcing problem with the high voltage transformer circuit. The enhanced diagnostic capability enabled by microcontroller 130 would allow identification of a problem before the impedance drops to a point where arcing would occur. The high voltage supply would also be able to detect potential problems and report them to MCM 102 via bus 114, where the MCM could then initiate remote interactive communications (RIC) with a host computer to request a service representative to further investigate the reason for the decreased impedance. As examples, the RIC systems described in U.S. patent application Ser. No. 07/771,882, now U.S. Pat. No. 5,241,402 by Aboujaoude et al. (filed as a continuation of application Ser. No. 07/445,809, now abandoned), or by Hill, Jr. et al. in U.S. Pat. No. 5,057,866 (Issued Oct. 15, 1991), the relevant portions of which are hereby incorporated by reference, would be suitable to initiate a service request for the electrophotographic machine. Hence, the power supply would not only self diagnose the arcing problem, but might do so before failure of the high voltage circuit, thereby enabling its repair or replacement before a complete failure causes the shutdown of the electrophotographic machine. By periodically sensing the current and voltage characteristics of the high voltage outputs and using commonly known techniques to analyze trends within the current and voltage levels, microcontroller 130 may also be used to detect or predict the failure of the pre-clean, transfer and charging corotrons which are powered by transformer blocks 138, 140, and 142, respectively.

Figure 4:
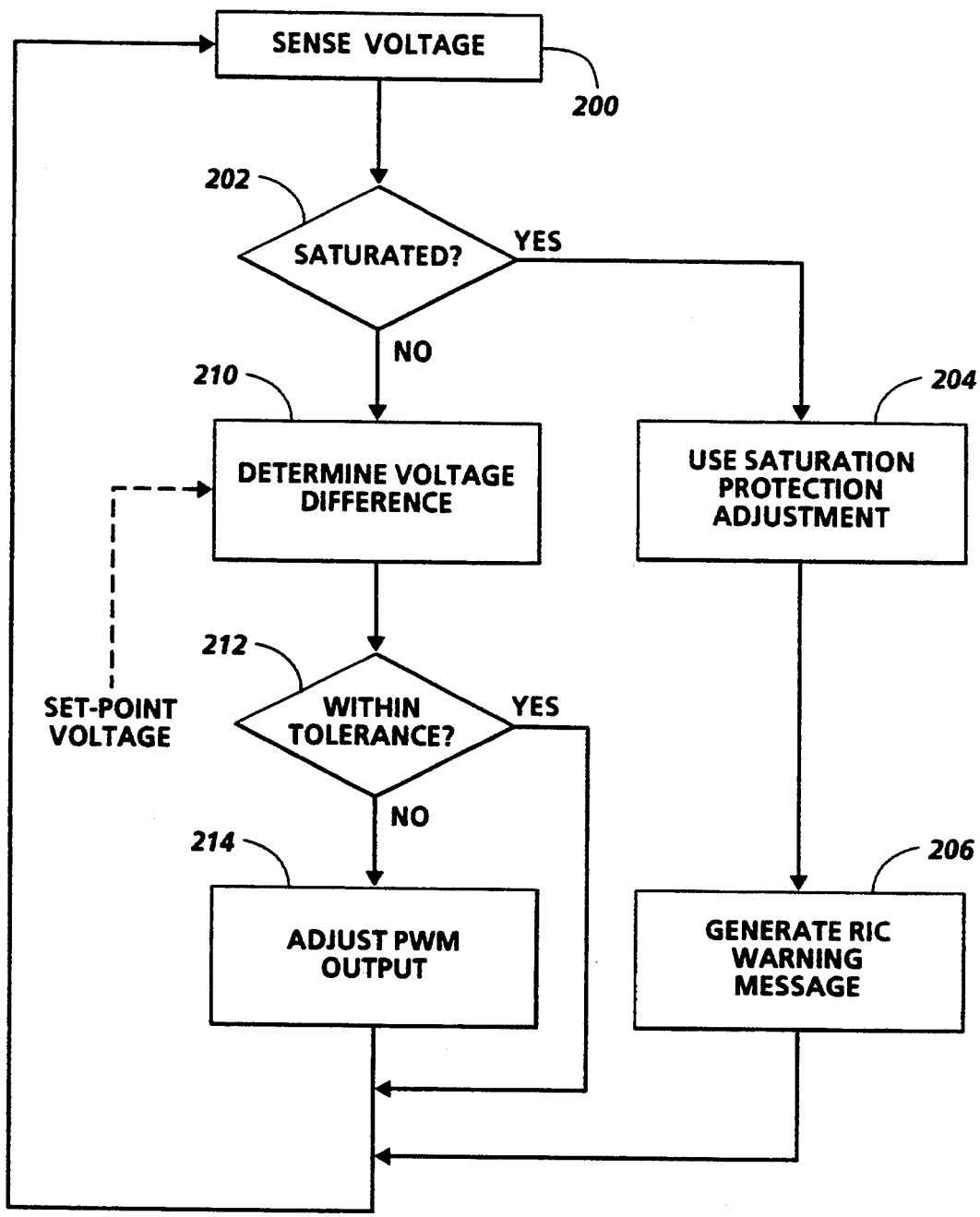
FIG. 4 is a simplified flow diagram illustrating the control operations executed by the microcontroller of FIG. 2 in one embodiment of the present invention.

Referring now to FIG. 4, during normal operation microcontroller 130 periodically samples the voltage of each of the high voltage outputs in order to control the potential across the secondary windings of transformers 150. Here again, the voltage may be electrically isolated representations of the voltages across the secondary windings, S, as represented by $HV_{OUT}$, or the sampled voltages may, more simply, be an indication of the voltage across the primary windings, P, as represented by $V_{PRIMARY}$, which would not require the voltage to pass through isolation circuitry before being fed back to microcontroller 130 via MUX 128. Once the selected voltage signal is supplied to the A/D input of the microcontroller, it is then converted into a digital representation of the potential, step 200. Next, the microcontroller determines whether the voltage of the transformer has reached a saturation potential, step 202, where little or no further control of the voltage level is possible. If so, it executes a control process which attempts to bring the transformer back into control. Typically, such a saturation condition is transient in nature. The control process merely limits the output during the transient period and subsequently attempts to bring the potential back to within normal operating parameters. As an example, in controlling the charging potential output by charge transformer block 142, an increase in the charge may be required to maintain copy quality as the photoconductive member within the printing machine ages. During the early stages of photoconductor aging, intermittent saturation modes may be encountered, whereby the photoconductor charging system may periodically require charging potentials at or near the saturation potential of the transformer. During this time, step 204, signals the saturation condition to MCM 102 which may in turn initiate remote interactive communication (RIC) to report the condition to a host computer, step 206.

If the high voltage supply has not reached a saturation potential, the converted signal is compared to a digital set-point voltage value, step 210, with the difference between the two values being used to adjust the pulse-width modulated output for the high voltage supply in accordance with conventional control theory. More specifically, once the difference between the actual and set-point values is determined, it is compared to an allowable tolerance range at step 212. If the tolerance is exceeded, the pulse-width modulated output is adjusted at step 214 in accordance with the magnitude and direction of the difference determined in step 210, the pulse-width signal being generated to control the "on-time" of the metal-oxide-semiconductor (MOS) devices used in the switching circuitry, 134. Generation of the pulse-width modulated signal is accomplished by programming the PWM and HSO outputs of the microcontroller as described in the Intel ® 16-Bit Embedded Controller Handbook, 1990, the relevant portions of which, specifically including the 80C196KB User's Guide, are hereby incorporated by reference. Otherwise, the pulse-width modulated signal output from the PWM port of microcontroller 130 remains unchanged. The PWM output of the microcontroller is supplied to driver/amplifier block 134 (FIG. 3), and is input to power control transistor Q2 to regulate the power applied to the primary coil. Subsequently, the control loop is repeated, beginning at step 200, for another of the high voltage outputs.

The use of a microcontroller also enables real-time alteration of the set-point reference voltage level, thereby allowing the MCM to transmit a new set-point voltage and an execution time to the HVPS, enabling an almost instantaneous response, less than about 20 milliseconds, in the associated high voltage output potential, or a response at a later time determined by the execution time sent by the MCM. For example, by specifying an execution time, the MCM could direct the HVPS to establish and regulate the bias voltage applied to a developer unit only when the module is to be used. Thus the set-point voltage levels for each of the high voltage outputs may be adjusted in accordance with other parameters of the electrophotographic machine, or at specific time intervals, without the need for intervention by a service technician to affect the adjustment during a set-up or service operation. This self-correcting capability renders the present invention particularly useful in the more critical, multicolor electrophotographic systems, where greater flexibility to adjust the output of the power supply during operation adds significant latitude to the electrophotographic process.

Another feature of the present invention is the capability of the HVPS to control the frequency of the high voltage outputs, as determined by the pulse-width modulated output. While the maximum frequency of the PWM or HSO outputs is limited to the maximum of the microcontroller output, the duty cycle and the period of the output cycle are programmable. In the present embodiment, microcontroller 130 enables the alteration of the duty cycle and period, which affords additional flexibility for the use of the power supply, thereby allowing the same power supply to be used when design parameters change. In operation, the cycle period would be controlled by programming the PWM or HSO registers as described in the Intel® 16-Bit Embedded Controller Handbook, 1990, the relevant portions of which have been previously incorporated herein by reference.

In recapitulation, the present invention is an apparatus for controlling the output of a high voltage power supply in accordance with a programmable set-point voltage. More specifically, the duty cycle and period of a pulse-width modulated signal may be used to control a conventional resonant or switching-type power supply, where the pulse-width modulated signal is controlled as a function of the set-point voltage and a sensed or approximated voltage produced by the power supply. As a result of the increased design flexibility provided by a high voltage power supply incorporating a microcontroller the present invention overcomes design flexibility limitations of conventional electroreprographic power supplies, resulting in greater process latitude necessary for multicolor electronic reprographic copiers and printers, along with the independently controllable outputs.

It is, therefore, apparent that there has been provided, in accordance with the present invention, an apparatus for producing a plurality of high voltage outputs, each of which is independently controllable by a single microcontroller. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A power supply comprising:
   an input power source for generating power, wherein said input producing source generates a low voltage current;
   voltage output means, responsive to a voltage control signal, for producing a high voltage output from the low voltage current supplied by said input power source, where the voltage output means includes a step-up transformer having a primary and a secondary coil therein for converting the low voltage current applied to the primary coil of said step-up transformer into the high voltage output at the secondary coil;
   means for sensing the potential of the high voltage output and generating an analog voltage signal indicative thereof by approximating the potential of the high voltage output as a function of the voltage applied across the primary coil; and
   a microcontroller for receiving the analog voltage signal from said sensing means, said microcontroller regulating the voltage control signal as a function of the analog voltage signal and a voltage set-point value, wherein said microcontroller includes
      an output port suitable for generating the voltage control signal as a pulse-width modulated signal; and
      an analog-to-digital converter for converting the analog voltage signal into a digital value for comparison to the voltage set-point value.

2. The power supply of claim 1, wherein said voltage output means further comprises an output filter for converting a high voltage alternating current present on the secondary coil of said step-up transformer into a high voltage direct current.

3. The power supply of claim 1, wherein said voltage output means includes
   a switching circuit to convert the low voltage current to a switched low voltage current, said switching circuit comprising a control transistor, responsive to the pulse-width modulated signal output by said microcontroller, to regulate the power supplied to the primary coil of said step-up transformer.

4. The power supply of claim 1, wherein the microcontroller further includes art detecting means for identifying the occurrence of electrical arcing across the high voltage output.

5. A power supply comprising:
   a direct current input power source for generating power;
   a plurality of converting means, each responsive to a voltage control signal, for converting the direct current power supplied by said direct current input power source into alternating current power;
   a plurality of transformers, each including primary windings to which the alternating current power of an associated converting means is supplied, and secondary windings for producing a high voltage output in response to the alternating current power supplied to the primary windings;
   means, associated with each of said plurality of transformers, for approximating the potential of the high voltage output produced by each transformer as a function of the voltage applied across the windings of at least one of said transformers and generating an analog voltage signal indicative thereof; and
   a microcontroller for receiving the analog voltage signals generated by said potential approximating means, and for producing the plurality of voltage control signals, wherein each voltage control signal is regulated as a function of the analog voltage signal and a voltage set-point value for the high voltage output of a particular transformer, wherein said microcontroller includes an output port suitable for generating a plurality of voltage control signals as pulse-width modulated signals; and an analog-to-digital converter for converting multiplexed analog voltage signals into digital values for comparison to associated voltage set-point values.

6. The power supply of claim 5, wherein one of said plurality of transformers includes a resistor-capacitor filter for integrating the high voltage output of said transformer to produce a high voltage direct current output.

7. The power supply of claim 5, wherein said approximating means include means for producing an isolated voltage signal as a function of the potential of the high voltage output, whereby the isolated voltage signal is a low voltage signal which is electrically isolated from the high voltage output.

8. The power supply of claim 5, wherein said microcontroller further includes arc detecting means for identifying the potential for arcing across the high voltage output, said arc detecting means identifying the occurrence of an arcing condition by calculating the impedance of a device to which the high voltage output is connected as a function of the voltage and current drawn by the device.

9. The power supply of claim 5, wherein one of said plurality of transformers produces a direct current voltage in the range of about 0 volts to about 550 volts.

10. The power supply of claim 9, wherein one of said plurality of transformers produces a voltage ranging from about 5 kilovolts to about 15 kilovolts.

11. The power supply of claim 10, wherein one of said plurality of transformers produces a voltage ranging from about −5 kilovolts to about −10 kilovolts.

12. An electrophotographic imaging apparatus, comprising:

a photoconductive member;

means for charging the photoconductive member;

means for exposing the charged photoconductive member to record an electrostatic latent image thereon;

means for developing the electrostatic latent image recorded on the photoconductive member with toner;

means for transferring the toner image from the photoconductive member to a support member;

a power supply including a plurality of outputs suitable for providing direct current power to the charging means, developing means and transferring means, and a microcontroller for controlling the voltage potential of each of the outputs, said microcontroller including an output port suitable for generating a plurality of voltage control signals as pulse-width modulated signals to control the voltage potentials on the outputs, and an analog-to-digital converter for converting a plurality of multiplexed analog voltage signals representing the voltage potential on the outputs into digital values for comparison to voltage set-point values uniquely associated therewith; and a master controller for controlling operation of the charging, imaging, development and transfer means, the master controller being capable of altering the voltage set-point for each of the charging, imaging, development and transfer means in response to variations within the electrophotographic imaging apparatus.

13. The electrophotographic imaging apparatus of claim 12, wherein the master controller is capable of specifying an execution time for altering one of the predetermined voltage set-points.

14. The electrophotographic imaging apparatus of claim 12, further including means for communicating between said microcontroller and said master controller, enabling the microcontroller to report the presence of a fault condition within the power supply.

15. The electrophotographic imaging apparatus of claim 14, wherein said master controller further includes remote communication means for sending a service request to a remote host computer in response to the presence of the fault condition.

* * * * *

UNITED STATES PATENT AND TRADEMARK OFFICE
CERTIFICATE OF CORRECTION

PATENT NO. : 5,369,472
DATED : Nov. 29, 1994
INVENTOR(S) : Guru B. Raj et al.

It is certified that error appears in the above-indentified patent and that said Letters Patent is hereby corrected as shown below:

On the Title Page, item [54] and column 1, lines 2-3, the title should read as follows:

-- MICROPROCESSOR CONTROLLED HIGH VOLTAGE POWER SUPPLY FOR AN ELECTROPHOTOGRAPHIC IMAGING APPARATUS --

Signed and Sealed this

Twenty-first Day of March, 1995

*Attest:*

BRUCE LEHMAN

*Attesting Officer*      *Commissioner of Patents and Trademarks*